W. C. BYE.
Sulky-Harrows.

No. 136,131. Patented Feb. 25, 1873.

Witnesses:
John Becker
C. Sedgwick

Inventor:
Wm. C. Bye
per Munn & Co.
Attorneys.

UNITED STATES PATENT OFFICE.

WILLIAM CORBAN BYE, OF COLLETTE, INDIANA, ASSIGNOR TO HIMSELF AND JACOB BOSWORTH BLAZER, OF SAME PLACE.

IMPROVEMENT IN SULKY-HARROWS.

Specification forming part of Letters Patent No. 136,131, dated February 25, 1873.

*To all whom it may concern:*

Figure 1:
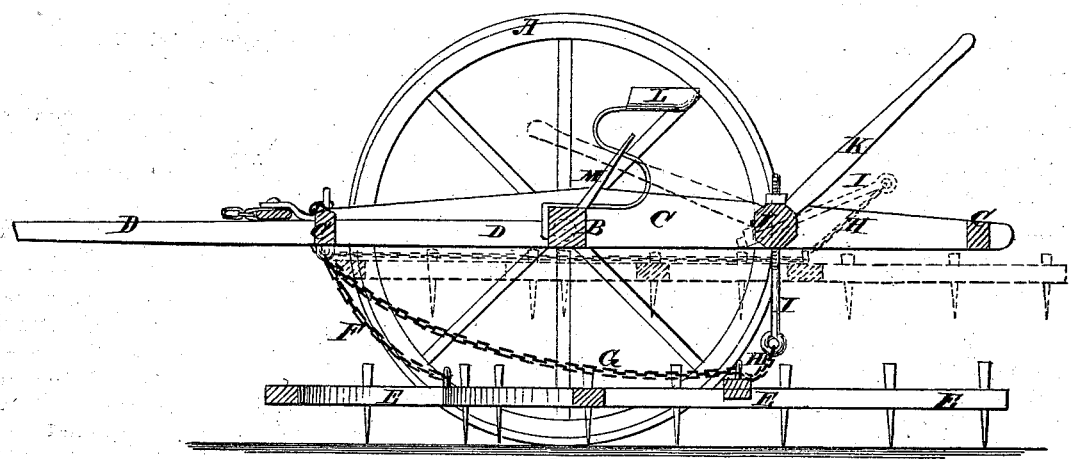
Figure 2:
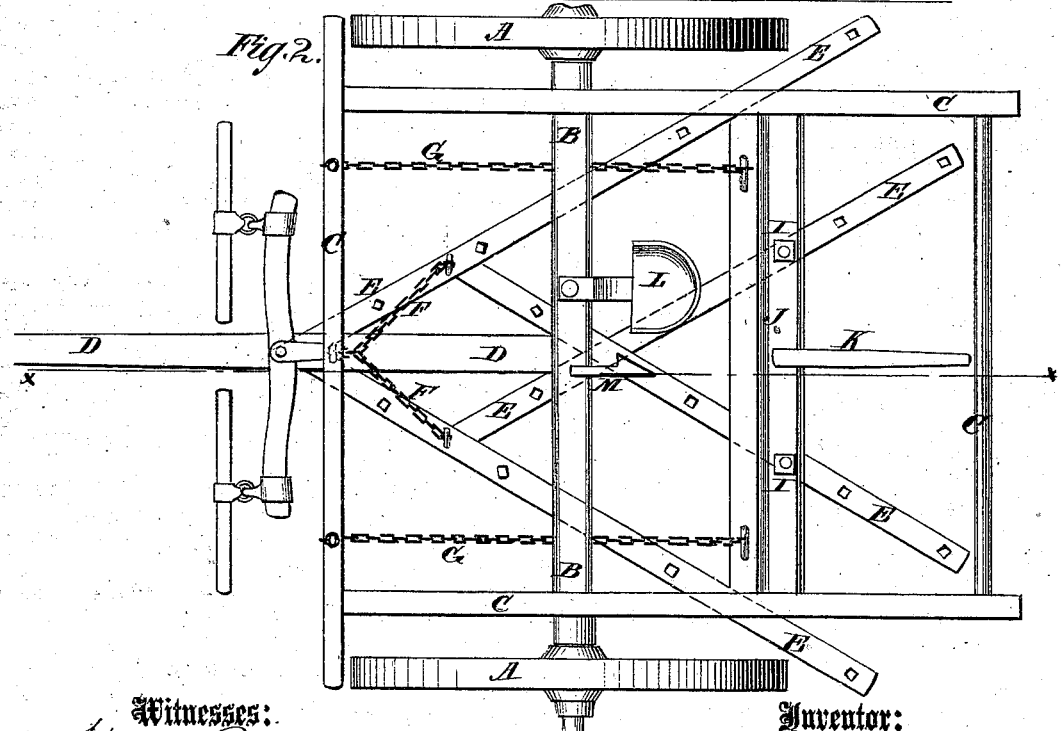

Be it known that I, WILLIAM CORBAN BYE, of Collette, in the county of Jay and State of Indiana, have invented a new and useful Improvement in Sulky-Harrow, of which the following is a specification:

Figure 1 is a vertical longitudinal section of my improved harrow taken through the line *x x*, Fig. 2. Fig. 2 is a top view of the same.

Similar letters of reference indicate corresponding parts.

My invention has for its object to furnish an improved sulky-harrow, simple in construction, convenient in use, and effective in operation, enabling the driver to ride, and make it easier upon the team by securing a steadier and more regular draft. My improvement consists in the combination, with a harrow suspended from the front end of the truck by means of chains, which may also serve as its draft-chains, of lifting devices which are connected to the rear end of the harrow, and which in elevating it also swing it rearward, whereby the suspension and draft chains are drawn upon so as to sustain the forward end of the harrow in its elevated position.

A are the sulky-wheels, which revolve upon the journals of the axle B, which should be made of such a length that the harrow may be wholly or mostly received between the wheels A. To the axle B is rigidly attached a frame, C. D is the tongue, to which the draft is applied, and which is attached to the center of the front cross-bar of the frame C, and to the center of the axle B. E is the harrow, which may be a double V-harrow, as shown in the drawing, or a harrow of any other desired form. F is a chain, the upper end of which is attached adjustably to the tongue D by a bolt or other suitable and substantial means. The lower part of the chain F is made branched, and the ends of its branches are attached to the forward part of the harrow E. G are two chains, the lower or rear ends of which are attached to the rear part of the harrow and toward its sides. The forward ends of the chains G are attached adjustably to the front cross-bar of the frame C. To the rear part of the harrow E are attached the lower ends of two short chains, H, the upper ends of which are attached to the outer ends of two arms, I, the other ends of which are rigidly attached to a roller or shaft, J, the ends of which are pivoted to the side bars of the frame C. To the roller J is rigidly attached a lever, K, which projects into such a position that it may be conveniently reached and operated by the driver from his seat L, the standard of which is attached to the axle B. To the axle B is also attached a spring, M, to catch upon and hold the lever K, when it is lowered to raise the harrow from the ground for convenience in turning or passing from place to place.

By this arrangement, as the harrow is raised, the arms I draw it backward sufficiently to keep the chains F G taut, so that the forward part of the harrow may be supported by said chains F G, as shown in dotted lines in Fig. 1.

Having thus described my invention, I claim as new and desire to secure by Letters Patent—

The harrow E, suspended from the truck by the chains F and G, in combination with the lifting-chains H, arms I, and rock-shaft J K, substantially as specified.

WILLIAM CORBAN BYE.

Witnesses:
G. P. HOLLOWAY,
WILLIAM A. MILLER.